US008309276B2

(12) United States Patent
Jang et al.

(10) Patent No.: US 8,309,276 B2
(45) Date of Patent: Nov. 13, 2012

(54) PROCESS FOR PREPARING OF A CATALYST SOLUTION FOR FUEL CELL AND A MEMBRANE ELECTRODE ASSEMBLY USING THE SAME

(75) Inventors: Byungchul Jang, Daejeon (KR); Young Taek Kim, Seoul (KR); Jung-Eun Yang, Daejeon (KR); Youngsu Jiong, Daejeon (KR); Dong Hwan Ryu, Cheongju (KR); Min-Ho Seo, Busan (KR)

(73) Assignee: Hanwha Chemical Corporation (KR)

( * ) Notice: Subject to any disclaimer, the term of this patent is extended or adjusted under 35 U.S.C. 154(b) by 432 days.

(21) Appl. No.: 12/666,944

(22) PCT Filed: Nov. 6, 2007

(86) PCT No.: PCT/KR2007/005565
§ 371 (c)(1),
(2), (4) Date: Jan. 12, 2010

(87) PCT Pub. No.: WO2009/001992
PCT Pub. Date: Dec. 31, 2008

(65) Prior Publication Data
US 2010/0330463 A1 Dec. 30, 2010

(30) Foreign Application Priority Data
Jun. 25, 2007 (KR) .................. 10-2007-0062145

(51) Int. Cl.
*H01M 4/88* (2006.01)
(52) U.S. Cl. ........................... 429/535; 502/101
(58) Field of Classification Search .................. 429/535; 502/101, 159
See application file for complete search history.

(56) References Cited

U.S. PATENT DOCUMENTS

| | | | | |
|---|---|---|---|---|
| 5,211,984 A * | 5/1993 | Wilson | ............ | 429/535 |
| 5,861,222 A * | 1/1999 | Fischer et al. | ............ | 429/535 |
| 6,344,428 B1 * | 2/2002 | Lim et al. | ............ | 502/101 |
| 6,492,295 B2 * | 12/2002 | Hitomi et al. | ............ | 502/159 |
| 7,285,307 B2 * | 10/2007 | Hohenthanner et al. | ...... | 427/243 |
| 7,754,369 B2 * | 7/2010 | Starz et al. | ............ | 429/524 |
| 7,855,160 B2 * | 12/2010 | Velamakanni et al. | ....... | 502/159 |

(Continued)

FOREIGN PATENT DOCUMENTS

CN 1750301 3/2006

(Continued)

OTHER PUBLICATIONS

Taiwanese Office Action—Taiwanese Application No. 097111010 issued on Jul. 4, 2011, citing CN 1750301 and US 2004/0107869.

(Continued)

*Primary Examiner* — Helene Klemanski
(74) *Attorney, Agent, or Firm* — Cantor Colburn LLP

(57) ABSTRACT

The present invention discloses a process for preparing catalyst solution for a membrane-electrode assembly in a fuel cell, which comprises the steps of a) mixing a catalyst solution (Solution A) wherein catalyst particles are dispersed in water and an ion conductive resin solution (Solution B) wherein an ion conductive resin is dissolved in water, low boiling point organic solvent or a mixture thereof, to form a dispersion; b) mixing the dispersion obtained from step a) with functional additive dissolved in high boiling point solvent or a mixture of low boiling point solvent arid water (Solution C) to prepare catalyst ink dispersion; and c) aging the catalyst ink dispersion obtained from step b).

14 Claims, 4 Drawing Sheets

U.S. PATENT DOCUMENTS

| | | | |
|---|---|---|---|
| 7,972,743 B2 * | 7/2011 | Umeda et al. | 429/479 |
| 8,142,957 B2 * | 3/2012 | Zhang et al. | 429/535 |
| 2004/0107869 A1 | 6/2004 | Velamakanni et al. | |
| 2005/0064276 A1 * | 3/2005 | Sugawara et al. | 502/159 |
| 2005/0272595 A1 * | 12/2005 | Kobayashi et al. | 502/101 |
| 2006/0147788 A1 * | 7/2006 | Lee et al. | 429/40 |
| 2009/0202885 A1 * | 8/2009 | Kim et al. | 429/30 |

FOREIGN PATENT DOCUMENTS

| | | |
|---|---|---|
| JP | 2006190686 | 7/2006 |
| KR | 1020050054389 | 6/2005 |
| KR | 100721310 | 5/2007 |

OTHER PUBLICATIONS

Chinese Office Action—Chinese Application No. 200780053520.7 issued on Aug. 2, 2011.

J. H. Kim, et al., Influence of the solvent in anode catalyst ink on the performance of a direct methanol fuel cell, Journal of Power Sources 135, 2004, p. 29-35.

E Gulzow, et al., Dry layer preparation and characterisation of polymer electrolyte fuel cell components, Journal of Power Sources 86, 2000, p. 352-362.

* cited by examiner

PROCESS FOR PREPARING OF A CATALYST SOLUTION FOR FUEL CELL AND A MEMBRANE ELECTRODE ASSEMBLY USING THE SAME

TECHNICAL FIELD

The present invention relates to a catalyst solution for a membrane-electrode assembly in a fuel cell, and a process for preparing the membrane-electrode assembly using the same, wherein the process yield can be enhanced as compared to conventional techniques, the electrochemical performance is excellent, and the amount of the catalyst particles to be coated can be easily controlled.

BACKGROUND ART

A fuel cell is a device for directly converting chemical energy of fuel into electric energy by electrochemical reaction of fuel such as hydrogen or methanol with oxygen. Differently from conventional thermal power generation, a fuel cell exhibits higher efficiency of power generation because it does not undergo Carnot cycle, with less amount of exhaust gas comprising pollutant such as $NO_x$ and $SO_x$, without noise during operation. Thus, a fuel cell comes into the spotlight as a clear energy source for next generation.

Fuel cells are classified into polymer electrolyte membrane fuel cell (PEMFC), phosphoric acid fuel cell (PAFC), molten carbonate fuel cell (MCFC), solid oxide fuel cell (SOFC), and so on, depending on the electrolytes used. Among them, a polymer electrolyte membrane fuel cell has lower operation temperature than that of other types, and good efficiency of power generation with property of compactness, so that its usages for power source of electric vehicles, small-scale devices for power generation (such as those for home use), movable power source, power source for emergency, power source for military, and the like are potential.

A polymer electrolyte membrane fuel cell commonly consists of seven layers: a separator/a gas diffusion layer/a fuel electrode/a polymer electrolyte membrane/an air electrode/a gas diffusion layer/a separator. The structure consisting of 5-layer excluding the separators at both ends is commonly referred to as a membrane-electrode assembly (MEA).

As to the operative principle of a fuel cell, fuel such as hydrogen or methanol is uniformly supplied to the fuel electrode first, through the flow field of the separator and the gas diffusion electrode, while air or oxygen is uniformly supplied to the air electrode, likewise to the fuel electrode, through the flow field of separator and the gas diffusion electrode.

In the fuel electrode, fuel is oxidized to generate hydrogen ions and electrons. The hydrogen ions pass through the electrolyte membrane to move toward the air electrode, while the electrons passes through the conduit and load (which constitutes an external circuit) to move toward the air electrode. The hydrogen ions and electrons undergo reduction with oxygen in the air electrode to generate water, which is discharged out of the fuel cell.

Various factors influence the performance of a fuel cell. When considering only a membrane-electrode assembly, the pore structure should be properly controlled to have compatibility of gas diffusion property, ion conductivity and moisturizing property in the fuel electrode and the air electrode, and it is very important to enlarge effective reaction area which is commonly referred to as three-phase boundary reaction area.

Processes for preparing a membrane-electrode assembly essentially include a process of direct applying an ink comprised of catalyst, polymer electrolyte and solvent on a polymer electrolyte membrane (J. Power Sources, 86, (2000), 352); and a process of applying said ink on a gas diffusion electrode such as carbon paper or carbon cloth and compressing it on a polymer electrolyte membrane.

According to the latter process, catalyst particles are apt to be depressed in the porous gas diffusion electrode, so that a homogeneous catalyst layer can be hardly obtained. In addition, mechanical damage may occur due to compression, and the pore structure cannot be appropriately controlled in the coated catalyst layer, so that electrochemical performance cannot be substantially developed.

For directly applying said ink on a polymer electrolyte membrane, commonly employed are screen printing, roller printing, spraying, ink-jet printing, and the like. In case of employing screen printing or roller printing, it is difficult to apply a small amount of ink, while the polymer electrolyte membrane is apt to expand with an increased amount of coated ink, on the other hand. In case of ink-jet printing, the disadvantage indicated is that the coating time is too long to reduce the productivity since the amount of ink to be coated is substantially a trace amount.

In the meanwhile, spraying is advantageous in that the amount of coating can be controlled at will, and the steady amount of coating can be obtained even in case of ink with low viscosity. However, problems have been indicated in that, clogging of the spray nozzle may occur when the solvent is evaporated or dispersion stability of catalyst particles is lowered at the time of coating on the electrolyte membrane, thereby causing reduced process yield and difficulties in controlling the amount of coating.

As an attempt to control the pore structure of the catalyst layer by altering the ink composition and to enhance the electrochemical performance thereby, Japanese Patent Laid-Open No. 2000-353528 discloses that a catalyst-polymer complex is synthesized by using a catalyst carrier having a porous structure of 3-dimensional network and one or more polymer(s), to be used in the ink.

As other attempts, Japanese Patent Laid-Open No. 1996-264190 and J. Power Sources 135(2004) 29 discloses that the polymer electrolyte to be incorporated to the ink is dispersed in solvent to form colloid, and the colloid is adsorbed on the catalyst particles, while Japanese Patent Laid-Open No. 2000-188110 and 2005-108827 disclosed that the molecular weight of the polymer electrolyte incorporated in the ink is lowered. However, those techniques were unsatisfactory to fulfill the purposes of compatibility of gas diffusion property, ion conductivity and moisturizing property, and they might cause environmental problems due to use of excessive amount of organic solvent.

DISCLOSURE

Technical Problem

The object of the present invention is to provide a catalyst solution for a membrane-electrode assembly in a fuel cell, and a process for preparing the membrane-electrode assembly using the same, wherein the process yield can be enhanced as compared to conventional techniques, the electrochemical performance is excellent, and the amount of application of the catalyst particles can be easily controlled, in order to overcome the problems of conventional techniques as mentioned above.

Technical Solution

The present invention relates to a process for preparing catalyst solution for a fuel cell wherein the particle size, viscosity of the catalyst solution, and surface tension of the solvent are controlled to make the pore structure of the catalyst layer after application a three-dimensional network, which comprises the steps of a) mixing a catalyst solution (Solution A) wherein catalyst particles are dispersed in water and an ion conductive resin solution (Solution B) wherein an ion conductive resin is dissolved in water, low boiling point organic solvent or a mixture thereof, to form a dispersion;

b) mixing the dispersion obtained from step a) with functional additive dissolved in high boiling point solvent or a mixture of low boiling point solvent and water (Solution C) to prepare catalyst ink dispersion; and c) aging the catalyst ink dispersion obtained from step b).

A process according to one embodiment of the present invention is described in detail.

In step a), catalyst solution (Solution A) and ion conductive resin solution (Solution B) are mixed and dispersed. Solution A is prepared by mixing catalyst particles in ultrapure water to remove gas or other pollutant adsorbed on the surface of the catalyst particles, and substituting the surface to become hydrophilic. The catalyst particles used in this stage comprise metal such as platinum, ruthenium, palladium, gold, iridium, rhenium, iron, nickel, cobalt, tungsten and molybdenum, or their alloy, carried on the surface of a carboneous substance such as carbon black, activated carbon, carbon nanotubes, carbon nanofibers, carbon nanohorns and carbon balls, or a mixture thereof, in a size of several nanometers. The amount of the metal carried is 10 to 60 parts by weight on the basis of 100 parts by weight of the carrier. The amount of catalyst particles to be incorporated preferably is at least 0.1 part by weight per 100 parts by weight of ultrapure water, but the present invention is not particularly restricted to this condition.

Then the ion conductive resin solution (Solution B) prepared by dissolving the ion conductive resin in water, low boiling point solvent or aqueous solution of low boiling solvent, is added to the catalyst solution (Solution A), and dispersed by using a homogenizer or a bead mill to obtain the mean size (d50) of the catalyst particles of 2 μm or less. The ion conductive resin partly serves to prevent cohesion of particles by being adsorbed on the surface of catalyst particles to induce electric repulsion or steric repulsion between the particles.

The amount of ion conductive resin suitably is 10 to 150 parts by weight with respect to 100 parts by weight of catalyst particles. If the amount is less than 10 parts by weight, dispersibility of ink decreases so that clogging of nozzle may occur during the spraying process. On the other hand, if the amount is more than 150 parts by weight, the ion conductive resin may cover the catalyst particles after spray coating, to result in decrease of effective reaction area for electrochemical reaction.

The low boiling point solvent usable in the present invention can be a solvent selected from alcohols such as methanol, ethanol, isopropyl alcohol, butanol, hexanol and cyclohexanol; ketones such as acetone, methyl ethyl ketone (MEK), methyl isobutyl ketone (MIBK), cyclohexanone, isophorone, 4-hydroxy-4-methyl-2-pentanone; and hydrocarbons such as toluene, xylene, hexane and cyclohexane; or a mixture thereof. To the solvent, amides such as N,N-dimethylformamide, N,N-dimethylacetoamide and sulfoxide may be partially added. In step b), a solution prepared from an additive in a low concentration aqueous solution of high boiling point solvent or in a low concentration aqueous solution of high boiling point solvent and low boiling point solvent (Solution C) is mixed with the dispersion obtained from step a) with stirring, in order to additionally provide functionality.

At this time, the high boiling point solvent serves to maintain the aggregation (which is formed from cohesion of catalyst particles and polymer resin, when the low boiling point solvent is previously evaporated during the spraying process) for a certain period to facilitate conversion to a 3-dimensional porous structure suitable for electrochemical reaction. Thus the surface tension, evaporation rate and boiling point of solvent are very important. The solvent must not undergo chemical reaction with ink particles or the ionic polymer resin, and must not cause phase separation or precipitation with other solvent comprising the ink component.

The high boiling point solvent used in the present invention is selected from polyhydric alcohols such as ethylene glycol, propylene glycol, triethylene glycol, butylenes glycol, 1,4-butanediol, 2,3-butanediol and glycerin; polyalkylene glycols, diethylene glycol, dipropylene glycol; and monoalkylether derivatives such as monomethyl ethers and monoethyl ethers; and mixtures thereof. Appropriate amount of the high boiling point solvent is 10~1000 parts by weight with respect to 100 parts by weight of catalyst particles.

In the preparation process according to the invention, employed can be one or more functional additive(s) such as water repellent polymer, conductive particles, pH modifier and leveling agent.

The water repellent polymer serves to readily discharge water (the product in the catalyst layer) outside, and fluorine-containing polymer such as polytetrafluoroethylene (PTFE) is suitably used.

The conductive particles additionally increase the electron conductivity in the catalyst layer. Suitably used are graphite, carbon black, carbon nanotubes, carbon nanofibers, carbon nanohorns, carbon balls or a mixture thereof, having the primary particle size of 1 μm or less. Oxide particles having electron conductivity such as titanium black ($TiO_xN_y$, ($x=0.8~1.2$, $y<0.2$)) and iron oxide ($Fe_3O_4$) may be used.

The pH modifier serves to control zeta potential of the ink to increase dispersion stability. Conventional acidic or basic organic substances can be used.

The leveling agent levels the surface of the catalyst layer after application, to prevent mechanical damage of interface when preparing the membrane-electrode assembly in combination with the gas diffusion electrode upon application. Conventional surfactants may be used, but fluorine-containing surfactants are most suitable. According to the present invention, the amount of functional additives as described above preferably is not more than 1% by weight with respect to the catalyst solution prepared according to the invention.

In step c), the catalyst ink dispersion prepared from step b) is aged by storing at a predetermined temperature for a certain period to achieve phase equilibrium. Preferably, the aging condition is at a temperature lower than 5° C. for at least 12 hours, but the invention is not critically restricted to the condition.

The catalyst solution prepared as described above has viscosity of 100 cps or more, and mediate size (d50) of the secondary particles is distributed between 0.1 and 2 μm. Specifically, the viscosity of the catalyst solution is 100 to 300 cps. In terms of the composition, the amount of the catalyst particles is distributed within 3~10% by weight with respect to total ink; the amount of ion conductive resin is distributed within 10~150% by weight with respect to the amount of catalyst; the amount of high boiling solvent within 1~50% by weight with respect to total ink; and the water repellent polymer, conductive particles, pH modifier and leveling agent as functional additives amount not more than 5% by weight with respect to total ink, respectively.

According to the process of the present invention, catalytic solution for a fuel cell can be prepared, with increased process yield and excellent electrochemical performance as compared to the process by conventional techniques, and the amount of the catalyst particles to be coated can be easily controlled.

The present invention comprises a process for preparing a membrane-electrode assembly for a fuel cell by using the catalyst solution prepared according to the process for catalyst solution for a fuel cell as described above.

The catalyst solution for a fuel cell prepared according to the present invention is directly applied to both sides of the polymer electrolyte membrane by means of spraying process, and then dried and compressed at a high temperature to provide a membrane-electrode assembly. At the time of direct applying to both sides of the polymer electrolyte membrane, the catalyst solution is repeatedly applied in a small amount to delicately adjust the amount of the catalyst applied, and to further optimize the porous structure. The number of repeated applications preferably is at least 4. Specifically, the catalyst solution is repeatedly applied to the electrolyte membrane 4 to 10 times.

The present invention is advantageous in that the porous structure of the membrane-electrode catalyst layer is controlled as 3-dimensional network structure by adjusting the size of particles dispersed in the catalyst solution, the viscosity, and surface tension of the solvent.

Other and further objects, features and advantages of the invention will appear more fully from the following description.

BEST MODE

Now the present invention is illustrated in more detail by referring to specific examples. However, the present invention is not restricted by those examples, and it is apparent to a person having ordinary skill in the art that various alterations and modifications can be made within the spirit and scope of the invention.

Example 1

Platinum catalyst carried on carbon particles (TEC10V50E, manufactured by Tanaka Kabushiki Kaisha, 50% by weight Pt/C) (5.3 g) was mixed with water (25 g), and the mixture was stirred in an agitation barrel to prepare Solution A.

Separately, isopropyl alcohol (21 g) as low boiling point solvent was mixed with ion conductive resin solution containing 5% by weight of Nafion (Nafion solution DE512 manufactured by Du Pont) (31.6 g), and the mixture was stirred to prepare Solution B.

Solution B was incorporated to Solution A under stirring, and the mixture was dispersed by using an airtight homogenizer for 1 hour. Then, Solution C comprising water (6.6 g) and ethylene glycol (10.6 g) as high boiling point solvent mixed therein was added thereto. The resultant mixture was stirred for 10 hours to prepare catalyst slurry.

The catalyst slurry thus prepared was aged at the temperature lower than 5° C. for 24 hours, and coarse particles were removed by using a polymer membrane filter having the size of 1 μm (MMM1 from Pall) to finally obtain catalyst solution with viscosity of 230 cps.

Figure 1:
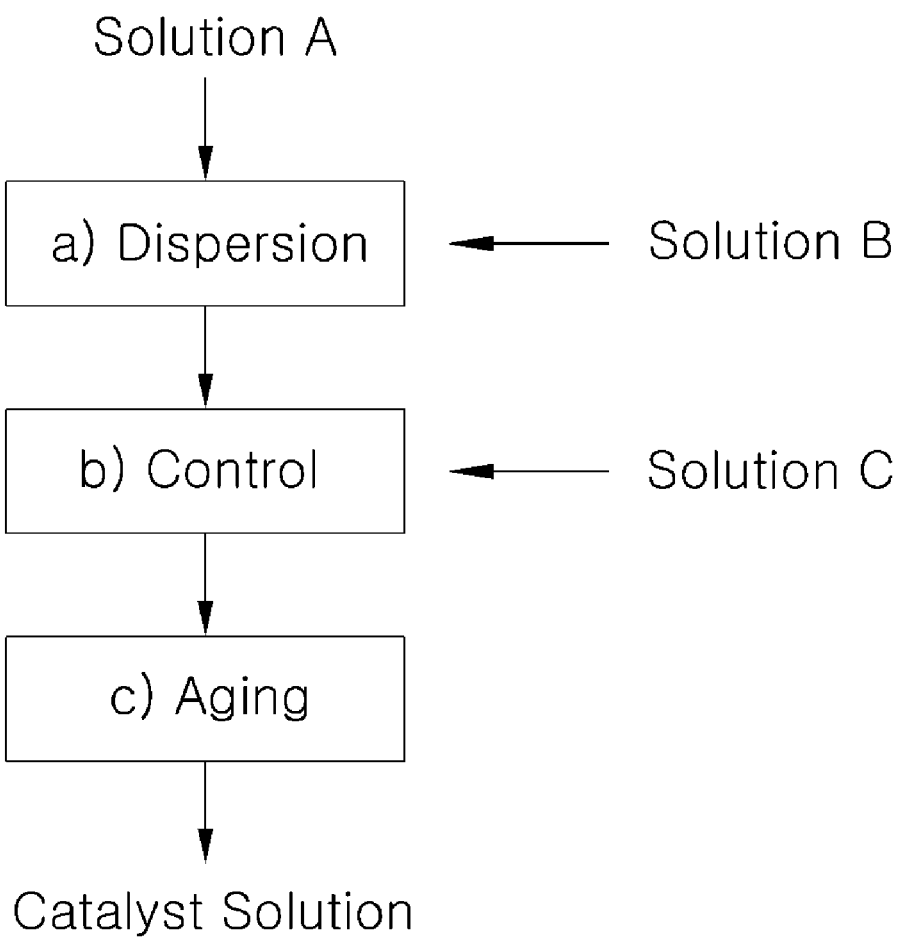
FIG. 1 is a flow diagram for preparing catalyst solution for a fuel cell according to one embodiment of the present invention.
Figure 2:
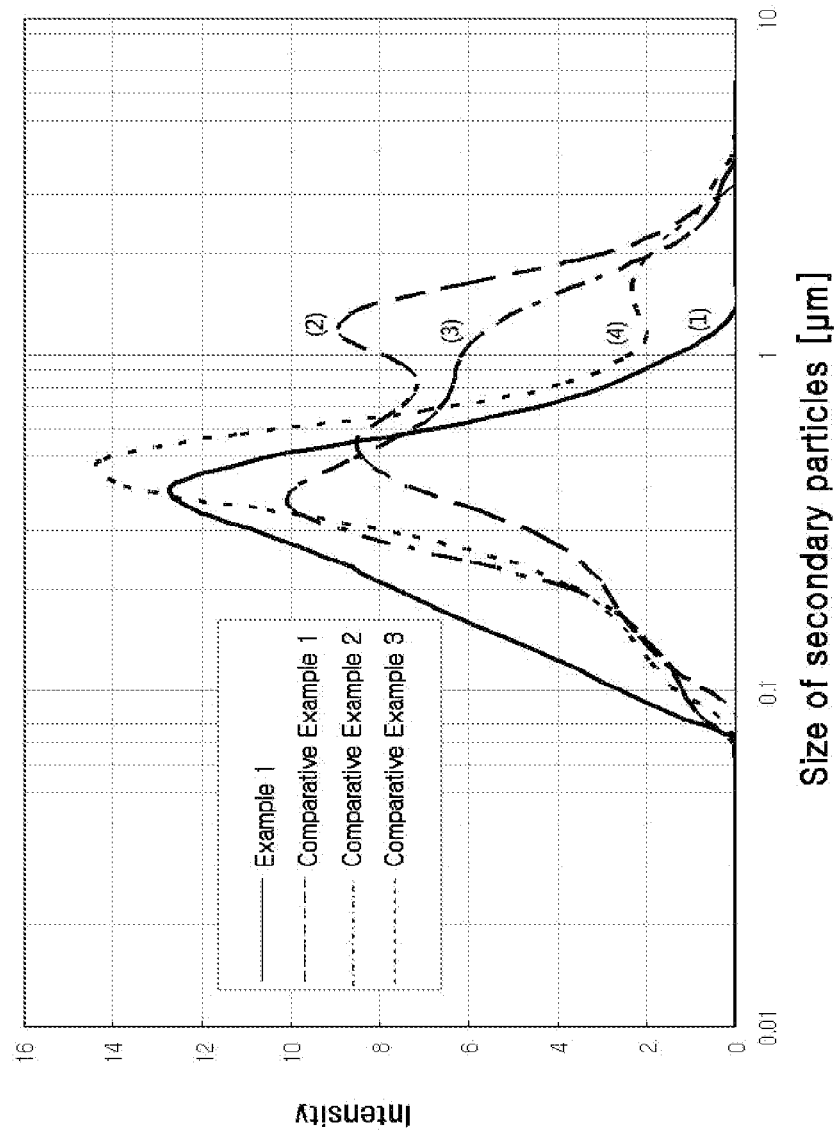
FIG. 2 is a graph showing the distribution of catalyst particles dispersed in the catalyst solutions prepared from Example 1 and Comparative Examples 1 to 3, respectively.

FIG. 2(1) shows the particle distribution of the catalyst solution prepared according to the invention, measured by a particle size analyzer (manufactured by Microtrac). The size of secondary particles of the catalyst dispersed in the ink (d50) was 0.4 μm.

The catalyst solution was repeatedly applied on both sides (air electrode, fuel electrode) of the electrolyte membrane (Nafion 112 from Du Pont), which had been previously modified according to conventional technique, four times respectively.

Table 1 shows the process conditions wherein the ink prepared from Example 1 and Comparative Examples 1 to 3, respectively was applied to the electrolyte membrane by means of a coater of spraying type, and results of observing the surface after the application by using a low-magnifying microscope of 1000× maginfication or less.

TABLE 1

| Sample | Hydraulic pressure (KPa) | Distance from S to N (mm) | Pitch (mm) | Temperature (° C.) | No. of coating | Coating state |
|---|---|---|---|---|---|---|
| (1) Ex. 1 | 3 | 90 | 10 | 60 | 4 | Good |
| (2) Comp. Ex. 1 | 3 | 90 | 10 | 60 | 1 | Nozzle clogged |
| (3) Comp. Ex. 2 | 3 | 90 | 10 | 60 | 4 | Cracks appeared |
| (4) Comp. Ex. 3 | 3 | 90 | 10 | 60 | 4 | Good |

Then the coated sample was dried by using a vacuum drier, and gas diffusion layers (SIGRACRT GDL 35BC from SGL CARBON GROUP) were hot compressed on the both sides of the sample under the condition: temperature 120° C., pressure 0.5 MPa, and compression time 1 minute, to finally obtain a membrane-electrode assembly. The coated area of the membrane-electrode assembly (effective reaction area) was 100 cm², and the amount of coated catalyst was 0.2 mg/cm² on both the air electrode and the fuel electrode.

A unit cell was manufactured in order to evaluate the performances of the membrane-electrode assembly according to the invention.

A unit cell was manufactured by using two separators: a separator with an air flow field formed was attached to one side of the membrane-electrode assembly, while a separator with hydrogen gas flow field formed was attached on the other side.

As the separator, used was a resin impregnated graphite plate having the dimension of 18×14 cm$^2$, thickness of 2.0 mm and depth of the gas flow field of 1 mm. At both ends of the unit cell, a collector plate made of stainless material and an insulating plate made of electric insulator material were arranged. These plates and the unit cell were secured by using a fastening rod, and the fastening pressure was 100 kg/cm$^2$ per area of the separator.

Figure 3:
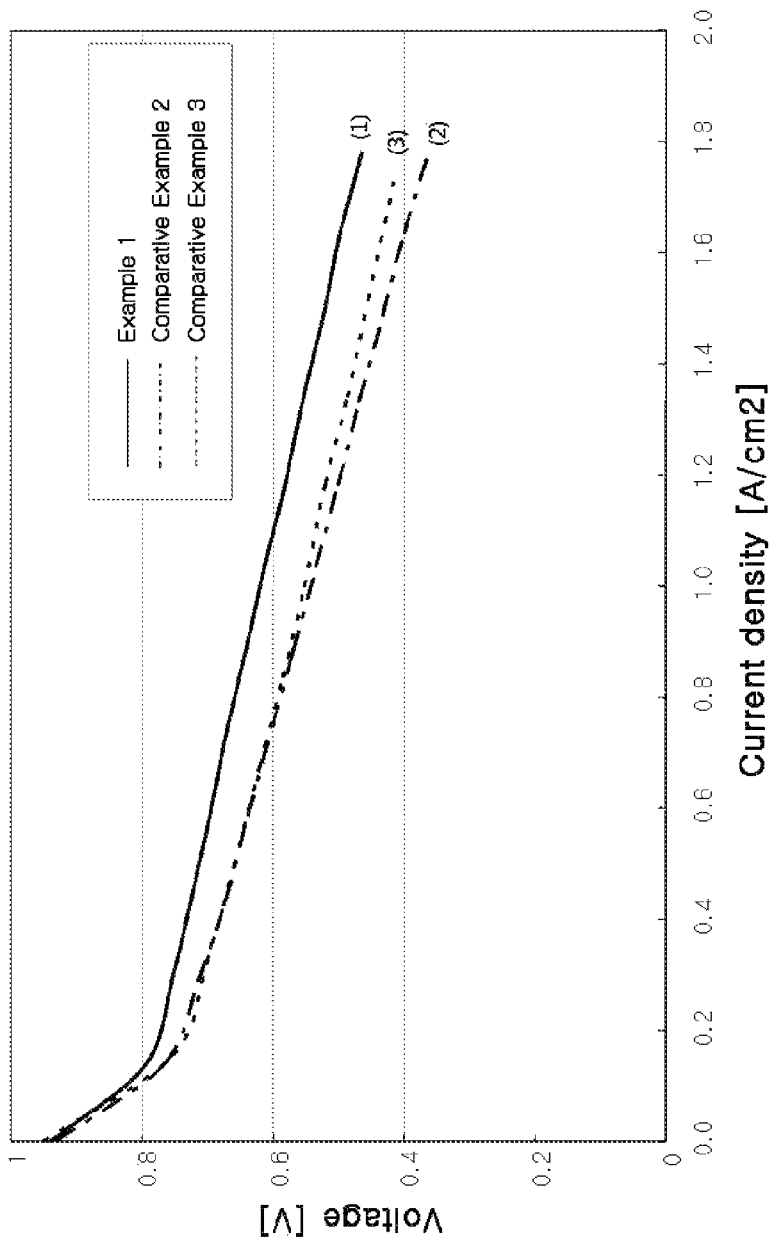
FIG. 3 is a graph of current-voltage measured after preparing a membrane-electrode assembly having efficient area of 100 cm² by using the ink prepared from Example 1, Comparative Example 2 and Comparative Example 3, respectively, and equipping the assembly to a unit fuel cell.

Evaluation of the unit cell was carried out under the conditions as follows. Hydrogen gas and air with elevated temperature and humidity (up to 65° C.) were supplied to the air electrode and the fuel electrode while maintaining temperature of the unit cell at 65° C. The utilization efficiency of hydrogen gas was determined as 70%, and that of air as 40%. Under such conditions, current-voltage property was measured by using FEL 150-2 Potentiastat (manufactured from AMEL). FIG. 3(1) shows the current-voltage property according to this Example: the electrochemical performance showed current density of 1.08 A/cm$^2$ on the basis of 0.6 V.

For the evaluation of performance on a fuel cell stack of the membrane-electrode assembly according to this Example, a stack consisting of ten (10) unit cells was manufactured. On both sides of the membrane-electrode assembly, a bipolar plate (wherein flow fields for gas and for cooling water had been formed) was attached, and a gasket and sealing material was sealed on the lateral face, to initially manufacture 10 unit cells which comprises base unit for the stack. The unit cells are laminated in series to provide a stack of fuel cells. As the bipolar plate, used was a resin impregnated graphite plate having the dimension of 18×14 cm$^2$, thickness of 2.0 mm, depth of the gas flow field of 1 mm, and depth of the cooling water flow field of 0.4 mm.

At both ends of the stack, a collector plate made of stainless material and an insulating plate made of electric insulator material were arranged. These plates and the 10 unit cells were secured by using a fastening rod, and the fastening pressure was 120 kg/cm$^2$ per area of the separator.

Figure 4:
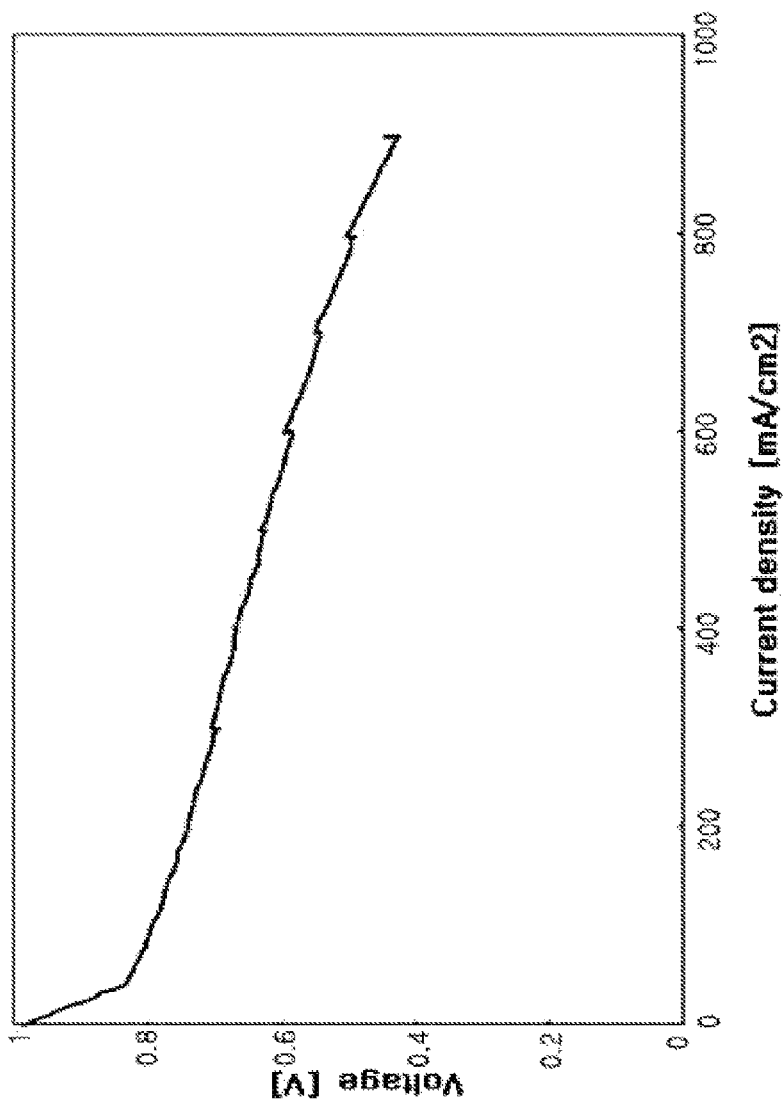
FIG. 4 is a graph of current-voltage measured after preparing a membrane-electrode assembly having efficient area of 100 cm² by using the ink prepared from Example 1, and equipping the assembly to a stack consisting of 10 unit cells.

Evaluation of the stack was carried out under the conditions as follows. Hydrogen gas and air with elevated temperature and humidity (up to 60° C.) were supplied to the air electrode and the fuel electrode while maintaining temperature of the stack at 60° C. The utilization efficiency of hydrogen gas was determined as 70%, and that of air as 40%. Under such conditions, current-voltage property was measured by using PLA 800-60-300 Potentiastat (manufactured from AMEL). FIG. 4 shows the current-voltage property according to this Example: the electrochemical performance showed current density of 530 mA/cm$^2$ on the basis of 0.6 V.

Comparative Example 1

According to known technique (JP2005-235444), platinum catalyst carried on carbon particles (50% by weight Pt/C) as was used in Example 1 was incorporated to a previously prepared single mixed solution comprised of water (40 g), ethanol (37.7 g), propylene alcohol (14 g), a solution of ion conductive resin containing 10 wt % of Nafion (Nafion solution DE512, from Du Pont) (5 g). The mixture was stirred and dispersed by using an airtight homogenizer for 1 hour to prepare catalyst slurry. The catalyst slurry was not subjected to additional aging or filtering.

FIG. 2(2) shows the particle distribution of the catalyst solution prepared according to this Example, measured by a particle size analyzer (manufactured by Microtrac). The size of secondary particles of the catalyst dispersed in the ink (d50) was 0.9 μm.

The catalyst solution was going to be repeatedly applied four times on both sides (air electrode, fuel electrode) of the electrolyte membrane by using a spray coater, but clogging occurred at the nozzle during the first coating process.

Comparative Example 2

By referring to the composition ratio of the ink described in known technique (JP2005-108827), catalyst solution was prepared according to the process suggested by the invention. The platinum catalyst carried on carbon particles (50 wt % Pt/C) (5.3 g) as was employed in Example 1 was mixed with water (25 g). The mixture was charged to an agitation barrel and stirred to prepare Solution A.

Separately, ethanol (44.4 g) was mixed with ion conductive resin solution containing 5% by weight of Nafion as was used in Example 1 (26.6 g), and the mixture was stirred to prepare Solution B.

Solution B was incorporated to Solution A under stirring, and the mixture was dispersed by using an airtight homogenizer for 1 hour. Then, water (19.6 g) was added, and the resultant mixture was stirred for 10 hours to prepare catalyst slurry. In this Comparative Example, no high boiling point solvent was incorporated.

The catalyst slurry thus prepared was aged at a temperature lower than 5° C. for 24 hours, and coarse particles were removed by using the same polymer membrane filter having the size of 1 μm (MMM1 from Pall) as was used in Example 1, to finally obtain catalyst solution with viscosity of 190 cps.

FIG. 2(3) shows the particle distribution of the catalyst solution prepared according to this Comparative Example, measured by a particle size analyzer (manufactured by Microtrac). The size of secondary particles of the catalyst dispersed in the ink (d50) was 0.7 μm.

The catalyst solution was applied, dried and compressed at a high temperature as was in Example 1 to prepare a membrane-electrode assembly. A unit cell was manufactured as was in Example 1, and the performance was evaluated.

Table 1(3) shows the spray coating conditions and the results, and FIG. 3(2) shows the current-voltage property according to this Comparative Example: the electrochemical performance showed current density of 0.7 A/cm$^2$ on the basis of 0.6 V.

Comparative Example 3

By referring to the composition ratio of the ink described in known technique (J. Power Sources, 135, (2004), 29), catalyst solution was prepared according to the process suggested by the invention. The platinum catalyst carried on carbon particles (50 wt % Pt/C) (5.3 g) as was employed in Example 1 was mixed with water (25 g). The mixture was charged to an agitation barrel and stirred to prepare Solution A.

To the solution, the same ion conductive resin solution containing 5% Nafion (31.6 g) as was used in Example 1 was incorporated, and the mixture was mixed and dispersed by using an airtight homogenizer for 1 hour.

Then, water (6.6 g) and dipropyl ketone (31.6 g) were added to thereto, and the resultant mixture was stirred for 10 hours to prepare catalyst slurry. In this Comparative Example, no low boiling point solvent was incorporated.

The catalyst slurry thus prepared was aged at a temperature lower than 5° C. for 24 hours, and coarse particles were removed by using the same polymer membrane filter having the size of 1 μm (MMM1 from Pall) as was used in Example 1, to finally obtain catalyst solution with viscosity of 250 cps.

FIG. 2(4) shows the particle distribution of the catalyst solution prepared according to this Comparative Example, measured by a particle size analyzer (manufactured by Microtrac). The size of secondary particles of the catalyst dispersed in the ink (d50) was 0.5 μm.

The catalyst solution was applied, dried and compressed at a high temperature as was in Example 1 to prepare a membrane-electrode assembly. A unit cell was manufactured as was in Example 1, and the performance was evaluated.

Table 1(4) shows the spray coating conditions and the results, and FIG. 3(3) shows the current-voltage property according to this Comparative Example: the electrochemical performance showed current density of 0.7 A/cm$^2$ on the basis of 0.6 V.

Differently from Example 1 of the invention, in Comparative Example 1 wherein the catalyst particles were directly incorporated to a single mixed solution to prepare the catalyst slurry without additional aging or filtering stage, the distribution of catalyst particles in the ink was not uniform as shown in FIG. 2, thereby causing aggregation and clogging of catalyst particles at the nozzle during the spray coating. Clogging of nozzle not only deteriorates the process yield of mass production, but also provides critical adverse effect upon applying repeated coating process in order to facilitate control of the amount of catalyst particles to be coated.

In Comparative Example 2 wherein the process for preparation was same as Example 1 of the invention but without using high boiling point solvent, the distribution of particles was not relatively uniform as shown in FIG. 2. Though 4 times of repeated application could be achieved without clogging of nozzle, cracks occurred on the coated surface after drying. Thus, the electrochemical performance showed far lower value: current density of 0.7 A/cm$^2$ on the basis of 0.6 V, as compared to 1.08 A/cm$^2$ on the basis of 0.6 V in Example 1.

In Comparative Example 3 wherein the process for preparation was same as Example 1 of the invention but without using low boiling point solvent, the distribution of particles was more or less improved as compared to Comparative Examples 1 or 2, as shown in FIG. 2, and clogging of nozzle did not occur. Though 4 times of repeated coating could be achieved, the electrochemical performance showed far lower value: current density of 0.7 A/cm$^2$ on the basis of 0.6 V, as compared to 1.08 A/cm$^2$ on the basis of 0.6 V in Example 1. Thus it is found that 3-dimensional pore structure suitable for electrochemical reaction was not fully created inside the coated catalyst layer, as compared to Example 1.

INDUSTRIAL APPLICABILITY

As described above, according to the present invention, an advantageous industrial process for preparing catalyst solution for a fuel cell can be obtained, wherein process yield can be increased because the nozzle is not clogged during the spray coating; excellent electrochemical performance can be obtained; at least 4 times of repeated coating is possible so that the amount of catalyst particles to be coated can be easily controlled.

The invention claimed is:

1. A process for preparing catalyst solution for a membrane-electrode assembly in a fuel cell, which comprises the steps of a) mixing a catalyst solution (Solution A) wherein catalyst particles are dispersed in water and an ion conductive resin solution (Solution B) wherein an ion conductive resin is dissolved in water, a low boiling point organic solvent or a mixture thereof, to form a dispersion;

b) mixing the dispersion obtained from step a) with a functional additive dissolved in a high boiling point solvent or a mixture of low boiling point solvent and water (Solution C) to prepare a catalyst ink dispersion; and c) aging the catalyst ink dispersion obtained from step b) at a temperature lower than 5° C. for at least 12 hours.

2. A process for preparing catalyst solution for a membrane-electrode assembly in a fuel cell according to claim 1, wherein the catalyst solution prepared from steps a), b) and c) has a viscosity of 100 to 300 cps, and a mediate size (d50) of secondary particles is 0.1 to 2 μm.

3. A process for preparing catalyst solution for a membrane-electrode assembly in a fuel cell according to claim 1, wherein the amount of catalyst in said catalyst solution is 3 to 10% by weight with respect to the total solution, and the amount of the ion conductive resin is 10 to 150% by weight with respect to said catalyst.

4. A process for preparing catalyst solution for a membrane-electrode assembly in a fuel cell according to claim 1, wherein the low boiling point solvent in step a) or b) is a solvent selected from the group consisting of alcohols, ketones, hydrocarbons and amides, and a mixture thereof.

5. A process for preparing catalyst solution for a membrane-electrode assembly in a fuel cell according to claim 1, wherein the high boiling solvent in step b) is a solvent selected from the group consisting of polyhydric alcohols, polyalkyleneglycols and monoalkylether derivatives, and a mixture thereof.

6. A process for preparing catalyst solution for a membrane-electrode assembly in a fuel cell according to claim 1, wherein the functional additive in step b) comprises one or more substance(s) selected from the group consisting of water-repellent polymers, conductive nanoparticles, pH modifiers and leveling agents.

7. A process for preparing catalyst solution for a membrane-electrode assembly in a fuel cell according to claim 6, wherein the water-repellent polymer is polytetrafluoroethylene (PTFE), which comprises 0~5% by weight of the catalyst solution thus prepared.

8. A process for preparing catalyst solution for a membrane-electrode assembly in a fuel cell according to claim 6, wherein the conductive nanoparticles are graphite, carbon black, carbon nanotubes, carbon nanofibers, carbon nanohorns, carbon balls, titanium black or iron oxide ($Fe_3O_4$), or a mixture thereof having the particle size of 0.01~1 μm, and comprises 0~5% by weight of the catalyst solution thus prepared.

9. A process for preparing a membrane-electrode assembly in a fuel cell, wherein the catalyst solution for a membrane-electrode assembly in fuel cell prepared according to claim 1 is applied to both sides of the electrolyte membrane via spraying or ink-jet process, and then dried and compressed at a high temperature.

10. A process for preparing a membrane-electrode assembly in a fuel cell according to claim 9, wherein the catalyst solution is repeatedly applied to the electrolyte membrane 4~10 times.

11. A process for preparing a membrane-electrode assembly in a fuel cell, wherein the catalyst solution for a membrane-electrode assembly in fuel cell prepared according to claim 2 is applied to both sides of the electrolyte membrane via spraying or ink-jet process, and then dried and compressed at a high temperature.

12. A process for preparing a membrane-electrode assembly in a fuel cell, wherein the catalyst solution for a membrane-electrode assembly in fuel cell prepared according to claim 8 is applied to both sides of the electrolyte membrane via spraying or ink-jet process, and then dried and compressed at a high temperature.

13. A process for preparing a membrane-electrode assembly in a fuel cell according to claim 11, wherein the catalyst solution is repeatedly applied to the electrolyte membrane 4~10 times.

14. A process for preparing a membrane-electrode assembly in a fuel cell according to claim 12, wherein the catalyst solution is repeatedly applied to the electrolyte membrane 4~10 times.

* * * * *